(12) United States Patent
Kim (10) Patent No.: US 12,181,223 B2
(45) Date of Patent: Dec. 31, 2024

(54) INTEGRATED RADIATOR

(71) Applicants: Hyundai Motor Company, Seoul (KR); Kia Corporation, Seoul (KR)

(72) Inventor: Ki Hyun Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 30 days.

(21) Appl. No.: 17/813,385

(22) Filed: Jul. 19, 2022

(65) Prior Publication Data
US 2023/0160639 A1    May 25, 2023

(30) Foreign Application Priority Data

Nov. 22, 2021    (KR) .................. 10-2021-0161625

(51) Int. Cl.
| | |
|---|---|
| *F28D 1/053* | (2006.01) |
| *B62D 25/08* | (2006.01) |
| *F28F 9/02* | (2006.01) |
| *F28F 9/22* | (2006.01) |
| *F28D 21/00* | (2006.01) |

(52) U.S. Cl.
CPC ....... *F28D 1/05391* (2013.01); *B62D 25/085* (2013.01); *F28F 9/0248* (2013.01); *F28F 9/22* (2013.01); *F28D 2021/0094* (2013.01)

(58) Field of Classification Search
CPC .......... F28D 1/05391; F28D 2021/0094; F28F 9/0248; F28F 9/22
See application file for complete search history.

(56) References Cited

U.S. PATENT DOCUMENTS

| | | | |
|---|---|---|---|
| 8,910,704 B2 * | 12/2014 | Mizuno ................ | F28F 9/0209 165/173 |
| 2012/0247742 A1 * | 10/2012 | Mizuno ............... | F28D 1/05391 165/173 |

FOREIGN PATENT DOCUMENTS

| | | | | |
|---|---|---|---|---|
| KR | 20100027324 A | * | 3/2010 | |
| KR | 20180131386 A | | 12/2018 | |
| KR | 2019033710 A | * | 4/2019 | ........... F28D 1/0443 |
| KR | 20190033710 A | | 4/2019 | |

* cited by examiner

*Primary Examiner* — Raheena R Malik
(74) *Attorney, Agent, or Firm* — SLATER MATSIL, LLP (57) ABSTRACT

An embodiment integrated radiator includes an upper section including an upper tube, a first upper tank, a first upper header, a second upper tank, and a second upper header, wherein the upper tube is configured to pass an upper-side coolant therethrough, a lower section including a lower tube, a first lower tank, a first lower header, a second lower tank, and a second lower header, wherein the lower tube is configured to pass a lower-side coolant therethrough, and a middle section disposed between the upper section and the lower section, the middle section including a middle tube, a first middle tank, a first middle header, a second middle tank, and a second middle header, wherein the middle tube is configured to receive a cooling medium therein.

17 Claims, 10 Drawing Sheets

INTEGRATED RADIATOR

CROSS-REFERENCE TO RELATED APPLICATIONS

This application claims the benefit of Korean Patent Application No. 10-2021-0161625, filed on Nov. 22, 2021, which application is hereby incorporated herein by reference.

TECHNICAL FIELD

The present disclosure relates to an integrated radiator.

BACKGROUND

A vehicle includes a plurality of radiators mounted on the front side thereof. The plurality of radiators may be disposed adjacent to a front grille of the vehicle, and each radiator may exchange heat with air drawn in through the front grille. Specifically, a coolant may pass through an internal passage of each radiator, and the air may pass over an exterior surface of each radiator so that heat exchange may be performed between the air and the coolant.

The plurality of radiators may be divided into a high temperature radiator through which a coolant of relatively high temperature passes and a low temperature radiator through which a coolant of relatively low temperature passes. The high temperature radiator and the low temperature radiator may be fluidly separated from each other, and the high temperature radiator may be physically separated from the low temperature radiator.

According to the related art, the high temperature radiator and the low temperature radiator may be arranged in a longitudinal direction of the vehicle in a front compartment of the vehicle. Accordingly, the layout and packaging of the high temperature radiator and the low temperature radiator may be complicated, and the weight and cost thereof may be increased. To solve these problems, research and development (R&D) is underway on an integrated radiator in which the high temperature radiator and the low temperature radiator are stacked vertically.

Meanwhile, as the high temperature radiator and the low temperature radiator directly contact each other, heat may be transferred between the high temperature radiator and the low temperature radiator, and thus the high temperature radiator and the low temperature radiator may be thermally affected by each other. As a result, it may be difficult to lower a temperature of the high-temperature coolant discharged from an outlet of the high temperature radiator and a temperature of the low-temperature coolant discharged from an outlet of the low temperature radiator.

The above information described in this background section is provided to assist in understanding the background of the inventive concept, and may include any technical concept which is not considered as the prior art that is already known to those skilled in the art.

SUMMARY

The present disclosure relates to an integrated radiator. Particular embodiments relate to an integrated radiator having a middle section interposed between an upper section and a lower section.

Embodiments of the present disclosure can solve problems occurring in the prior art while advantages achieved by the prior art are maintained intact.

An embodiment of the present disclosure provides an integrated radiator having a middle section including a cooling medium interposed between an upper section through which an upper-side coolant passes and a lower section through which a lower-side coolant passes, thereby improving cooling performance of at least one of the upper section and the lower section or improving cooling performance of the upper section and cooling performance of the lower section simultaneously.

According to an embodiment of the present disclosure, an integrated radiator may include an upper section including an upper tube, a first upper tank fluidly connected to a first end portion of the upper tube, a first upper header sealingly joined to the first upper tank, a second upper tank fluidly connected to a second end portion of the upper tube, and a second upper header sealingly joined to the second upper tank, a lower section including a lower tube, a first lower tank fluidly connected to a first end portion of the lower tube, a first lower header sealingly joined to the first lower tank, a second lower tank fluidly connected to a second end portion of the lower tube, and a second lower header sealingly joined to the second lower tank, and a middle section including a middle tube, a first middle tank fluidly connected to a first end portion of the middle tube, a first middle header sealingly joined to the first middle tank, a second middle tank fluidly connected to a second end portion of the middle tube, and a second middle header sealingly joined to the second middle tank, wherein an upper-side coolant may pass through the upper tube, a lower-side coolant may pass through the lower tube, and a cooling medium may be received in the middle tube.

The middle section including the cooling medium may be interposed between the upper section through which the upper-side coolant passes and the lower section through which the lower-side coolant passes, thereby improving the cooling performance of at least one of the upper section and the lower section or improving the cooling performance of the upper section and the cooling performance of the lower section simultaneously. For example, when a temperature difference between the upper-side coolant and the lower-side coolant is relatively low, the middle section may assist in the cooling of the upper section and the cooling of the lower section, thereby improving the cooling performance of the upper section and the cooling performance of the lower section simultaneously. When a temperature difference between the upper-side coolant and the lower-side coolant is relatively high, the middle section may be used to transfer heat from a relatively high temperature section to a relatively low temperature section, thereby improving the cooling performance of at least one of the upper section and the lower section.

The middle section may be fluidly separated from the upper section and the lower section by a plurality of baffles.

As the middle section may be fluidly separated from the upper section and the lower section by the plurality of baffles, leakage of the upper-side coolant, the cooling medium, and the lower-side coolant may be reliably prevented.

The plurality of baffles may include a first upper baffle horizontally extending from a bottom end of the first upper tank toward a bottom end of the first upper header, a first lower baffle horizontally extending from a top end of the first lower tank toward a top end of the first lower header, a second upper baffle horizontally extending from a bottom end of the second upper tank toward a bottom end of the second upper header, and a second lower baffle horizontally extending from a top end of the second lower tank toward a top end of the second lower header.

A first middle chamber of the middle section may be sealed by the first upper baffle and the first lower baffle, and a second middle chamber of the middle section may be sealed by the second upper baffle and the second lower baffle.

The integrated radiator may further include a blocking unit blocking each end portion of the middle tube.

As each end portion of the middle tube is sealingly blocked by the blocking unit, leakage of the cooling medium received in the middle tube may be reliably prevented.

The blocking unit may include a first blocking unit sealingly blocking the first end portion of the middle tube and a second blocking unit sealingly blocking the second end portion of the middle tube.

The first blocking unit may include a first blocking rib extending from one edge of the first middle header, and a first blocking portion foldably or unfoldably connected to the first blocking rib. The first blocking portion may block the first end portion of the middle tube.

The integrated radiator may further include a first support unit sealingly supporting the first blocking unit.

The first support unit may include a first support rib extending from the other edge of the first middle header and a first support portion foldably or unfoldably connected to the first support rib. The first support portion may be tightly attached to the first blocking portion.

The first support unit may further include a first edge support portion foldably or unfoldably connected to an edge of the first support portion.

As the first support unit sealingly supports the first blocking unit, sufficient sealing of the first end portion of the middle tube may be achieved.

The second blocking unit may include a second blocking rib extending from one edge of the second middle header and a second blocking portion foldably or unfoldably connected to the second blocking rib. The second blocking unit may block the second end portion of the middle tube.

The integrated radiator may further include a second support unit sealingly supporting the second blocking unit.

The second support unit may include a second support rib extending from the other edge of the second middle header and a second support portion foldably or unfoldably connected to the second support rib. The second support portion may be tightly attached to the second blocking portion.

The second support unit may further include a second edge support portion foldably or unfoldably connected to an edge of the second support portion.

As the second support unit sealingly supports the second blocking unit, sufficient sealing of the second end portion of the middle tube may be achieved.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF ILLUSTRATIVE EMBODIMENTS

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
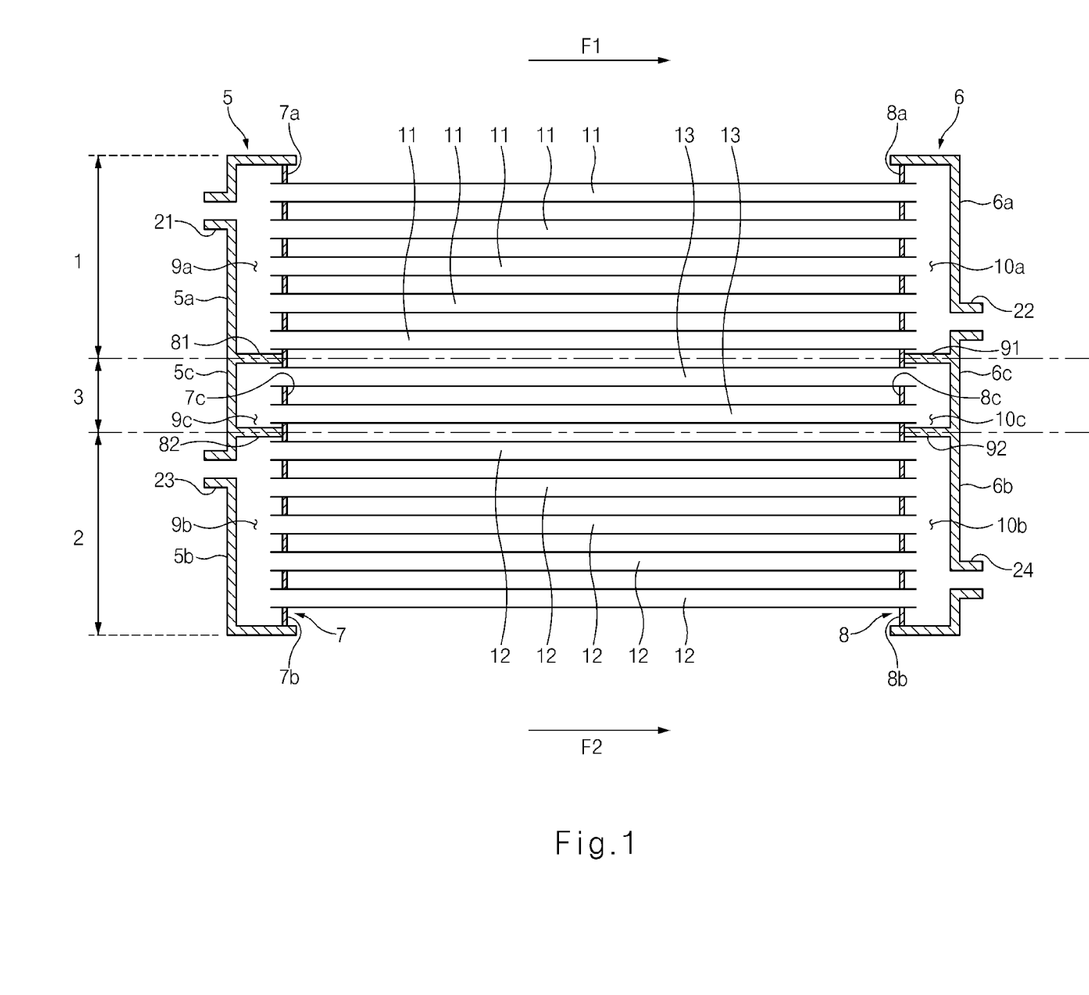
FIG. 1 illustrates an integrated radiator according to an exemplary embodiment of the present disclosure.

Referring to FIG. 1, an integrated radiator according to an exemplary embodiment of the present disclosure may include an upper section 1, a lower section 2 located below the upper section 1, and a middle section 3 interposed between the upper section 1 and the lower section 2.

Figure 6:
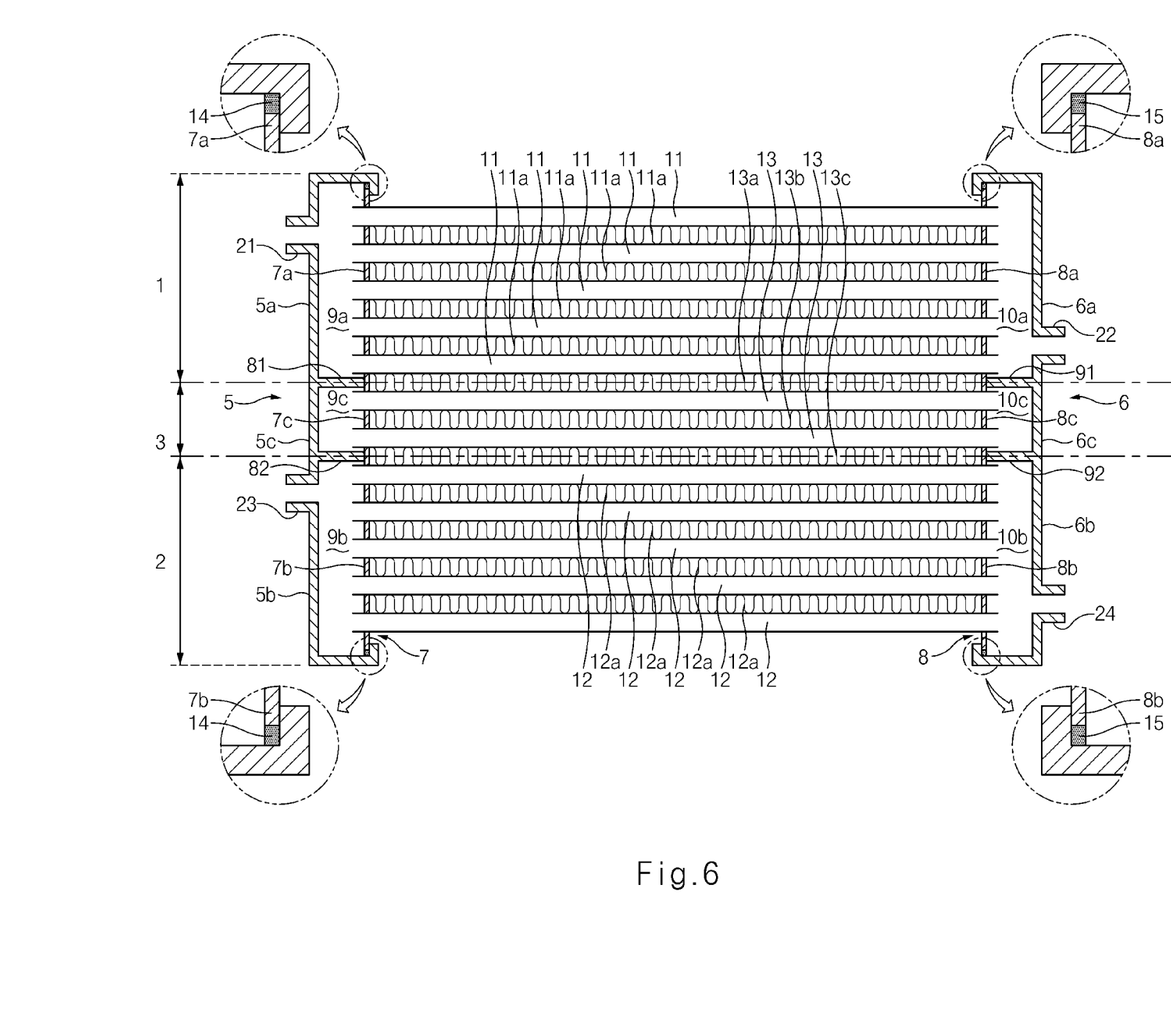
FIG. 6 illustrates the configuration of an integrated radiator according to an exemplary embodiment of the present disclosure.

The upper section 1 may include at least one upper tube 11, a first upper tank 5a fluidly connected to a first end portion of the upper tube 11, and a second upper tank 6a fluidly connected to a second end portion of the upper tube 11. The upper tube 11 may include a plurality of upper tubes, and the plurality of upper tubes 11 may be vertically spaced apart from each other. Air may pass through a gap between the adjacent upper tubes 11, and a coolant may pass through an internal passage of each upper tube 11. Referring to FIG. 6, a cooling fin 11a may be interposed between the adjacent upper tubes 11. The upper tube 11 may have the first end portion fluidly connected to the first upper tank 5a, and the second end portion fluidly connected to the second upper tank 6a. A longitudinal axis of the first upper tank 5a and a longitudinal axis of the second upper tank 6a may be perpendicular to a longitudinal axis of the upper tube 11.

A first upper header 7a and the first upper tank 5a may be sealingly joined so that the first upper header 7a and the first upper tank 5a may define a first upper chamber 9a. The first end portion of the upper tube 11 may be sealingly fitted into a hole of the first upper header 7a, and the upper tube 11 may fluidly communicate with the first upper chamber 9a. A second upper header 8a and the second upper tank 6a may be sealingly joined so that the second upper header 8a and the second upper tank 6a may define a second upper chamber 10a. The second end portion of the upper tube 11 may be sealingly fitted into a hole of the second upper header 8a, and the upper tube 11 may fluidly communicate with the second upper chamber 10a.

The lower section 2 may include at least one lower tube 12, a first lower tank 5b fluidly connected to a first end portion of the lower tube 12, and a second lower tank 6b fluidly connected to a second end portion of the lower tube 12. The lower tube 12 may include a plurality of lower tubes, and the plurality of lower tubes 12 may be vertically spaced apart from each other. Air may pass through a gap between the adjacent lower tubes 12, and a coolant may pass through an internal passage of each lower tube 12. Referring to FIG. 6, a cooling fin 12a may be interposed between the adjacent lower tubes 12. The lower tube 12 may have the first end portion fluidly connected to the first lower tank 5b, and the second end portion fluidly connected to the second lower tank 6b. A longitudinal axis of the first lower tank 5b and a longitudinal axis of the second lower tank 6b may be perpendicular to a longitudinal axis of the lower tube 12. A first lower header 7b and the first lower tank 5b may be sealingly joined so that the first lower header 7b and the first lower tank 5b may define a first lower chamber 9b. The first end portion of the lower tube 12 may be sealingly fitted into a hole of the first lower header 7b, and the lower tube 12 may fluidly communicate with the first lower chamber 9b. A second lower header 8b and the second lower tank 6b may be sealingly joined so that the second lower header 8b and the second lower tank 6b may define a second lower chamber 10b. The second end portion of the lower tube 12 may be sealingly fitted into a hole of the second lower header 8b, and the lower tube 12 may fluidly communicate with the second lower chamber 10b.

The middle section 3 may include at least one middle tube 13, a first middle tank 5c fluidly connected to a first end portion of the middle tube 13, and a second middle tank 6c fluidly connected to a second end portion of the middle tube 13. The middle tube 13 may include a plurality of middle tubes, and the plurality of middle tubes 13 may be vertically spaced apart from each other. Air may pass through a gap between the adjacent middle tubes 13, and a coolant may pass through an internal passage of each middle tube 13. Referring to FIG. 6, an upper cooling fin 13a may be interposed between the uppermost middle tube 13 and the lowermost upper tube 11, a middle cooling fin 13b may be interposed between the adjacent middle tubes 13, and a lower cooling fin 13c may be interposed between the lowermost middle tube 13 and the uppermost lower tube 12.

The middle tube 13 may have the first end portion fluidly connected to the first middle tank 5c and the second end portion fluidly connected to the second middle tank 6c. A longitudinal axis of the first middle tank 5c and a longitudinal axis of the second middle tank 6c may be perpendicular to a longitudinal axis of the middle tube 13. A first middle header 7c and the first middle tank 5c may be sealingly joined so that the first middle header 7c and the first middle tank 5c may define a first middle chamber 9c. The first end portion of the middle tube 13 may be sealingly fitted into a hole of the first middle header 7c, and the middle tube 13 may fluidly communicate with the first middle chamber 9c. A second middle header 8c and the second middle tank 6c may be sealingly joined so that the second middle header 8c and the second middle tank 6c may define a second middle chamber 10c. The second end portion of the middle tube 13 may be sealingly fitted into a hole of the second middle header 8c, and the middle tube 13 may fluidly communicate with the second middle chamber 10c.

Referring to FIG. 1, the first upper tank 5a, the first middle tank 5c, and the first lower tank 5b may form a single first tank 5 as a unitary one-piece structure. The first upper header 7a, the first middle header 7c, and the first lower header 7b may form a single first header 7 as a unitary one-piece structure. The second upper tank 6a, the second middle tank 6c, and the second lower tank 6b may form a single second tank 6 as a unitary one-piece structure. The second upper header 8a, the second middle header 8c, and the second lower header 8b may form a single second header 8 as a unitary one-piece structure.

According to an exemplary embodiment, the upper section 1 may be a high temperature radiator through which a coolant of relatively high temperature passes, and the lower section 2 may be a low temperature radiator through which a coolant of relatively low temperature passes.

According to another exemplary embodiment, the upper section 1 may be a low temperature radiator through which a coolant of relatively low temperature passes, and the lower section 2 may be a high temperature radiator through which a coolant of relatively high temperature passes.

In an internal combustion engine vehicle, the high temperature radiator may be configured to cool a high-temperature coolant passing through a water jacket of an internal combustion engine, and the low temperature radiator may be configured to cool a low-temperature coolant passing through a coolant passage of an EGR cooler.

In a hybrid vehicle, the high temperature radiator may be configured to cool a high-temperature coolant passing through a water jacket of an internal combustion engine, and the low temperature radiator may be configured to cool a low-temperature coolant passing through a coolant passage of power electronics (an electric motor, an inverter, etc.).

In an electric vehicle, the high temperature radiator may be configured to cool a high-temperature coolant passing through a coolant passage of powertrain components (an electric motor, power electronics, etc.), and the low temperature radiator may be configured to cool a low-temperature coolant passing through a coolant passage of a battery.

The upper section 1 and the lower section 2 may be fluidly separated from each other through the middle section 3. An upper-side coolant may pass through the upper section 1, and a lower-side coolant may pass through the lower section 2. The upper-side coolant and the lower-side coolant may cool different components.

The upper section 1 may include an upper inlet 21 through which the upper-side coolant is allowed to flow in, and an upper outlet 22 from which the upper-side coolant is discharged. The upper inlet 21 and the upper outlet 22 may be disposed in various positions of the first upper tank 5a and/or the second upper tank 6a to provide various flow directions of the upper-side coolant.

The lower section 2 may include a lower inlet 23 through which the lower-side coolant is allowed to flow in, and a lower outlet 24 from which the lower-side coolant is discharged. The lower inlet 23 and the lower outlet 24 may be disposed in various positions of the first lower tank 5b and/or the second lower tank 6b to provide various flow directions of the lower-side coolant.

According to an exemplary embodiment illustrated in FIG. 1, the upper inlet 21 may be positioned in an upper portion of the first upper tank 5a, and the upper outlet 22 may be positioned in a lower portion of the second upper tank 6a. Accordingly, the upper-side coolant may flow from the upper portion of the first upper tank 5a to the lower portion of the second upper tank 6a through the plurality of upper tubes 11, and thus the upper-side coolant may flow linearly (see direction F1 in FIG. 1) in the upper section 1.

According to the exemplary embodiment illustrated in FIG. 1, the lower inlet 23 may be positioned in an upper portion of the first lower tank 5b, and the lower outlet 24 may be positioned in a lower portion of the second lower tank 6b. Accordingly, the lower-side coolant may flow from the upper portion of the first lower tank 5b to the lower portion of the second lower tank 6b through the plurality of lower tubes 12, and thus the lower-side coolant may flow linearly (see direction F2 in FIG. 1) in the lower section 2.

Figure 2:
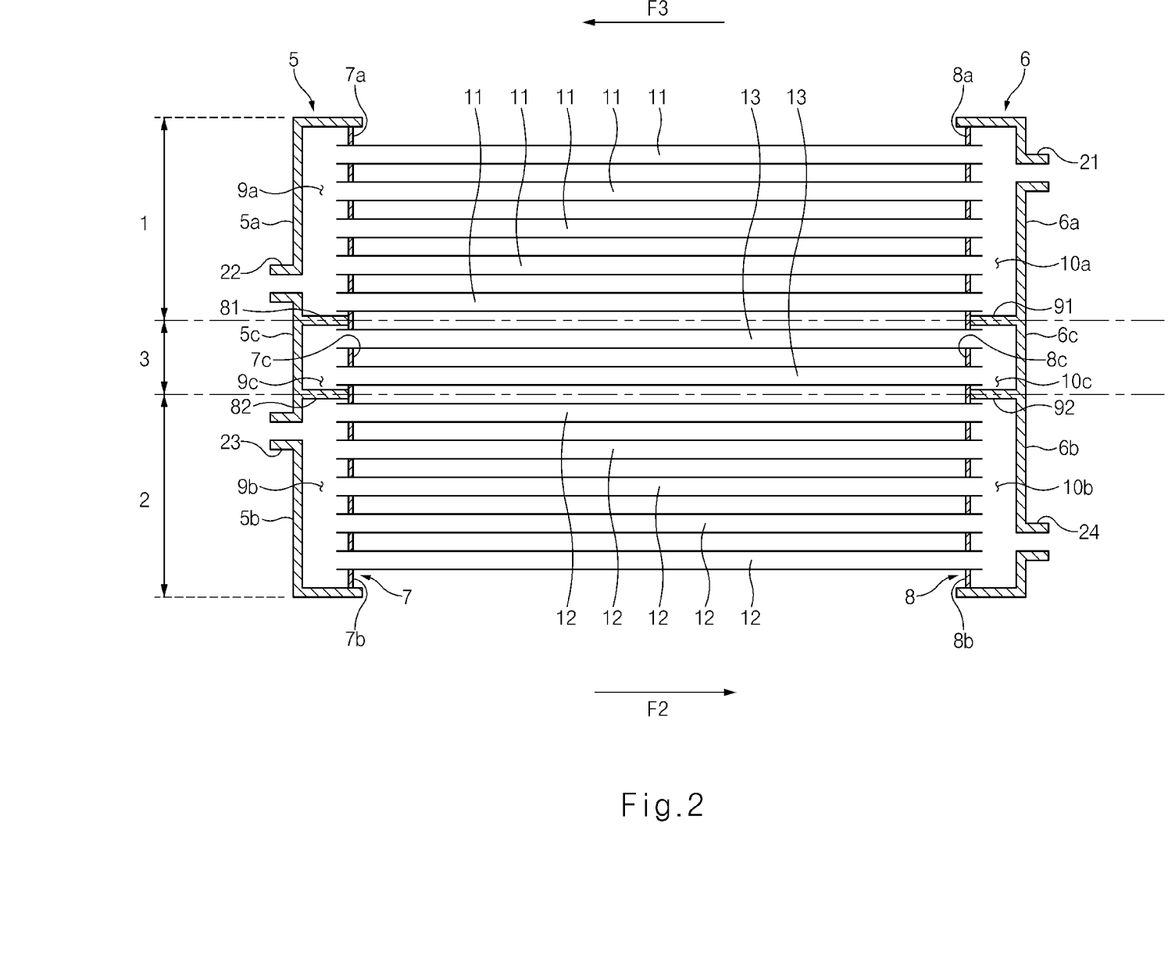
FIG. 2 illustrates an integrated radiator according to another exemplary embodiment of the present disclosure.

According to an exemplary embodiment illustrated in FIG. 2, the upper inlet 21 may be positioned in an upper portion of the second upper tank 6a, and the upper outlet 22 may be positioned in a lower portion of the first upper tank 5a. Accordingly, the upper-side coolant may flow from the upper portion of the second upper tank 6a to the lower portion of the first upper tank 5a through the plurality of upper tubes 11, and thus the upper-side coolant may flow linearly (see direction F3 in FIG. 2) in the upper section 1.

According to the exemplary embodiment illustrated in FIG. 2, the lower inlet 23 may be positioned in the upper portion of the first lower tank 5b, and the lower outlet 24 may be positioned in the lower portion of the second lower tank 6b. Accordingly, the lower-side coolant may flow from the upper portion of the first lower tank 5b to the lower portion of the second lower tank 6b through the plurality of lower tubes 12, and thus the lower-side coolant may flow linearly (see direction F2 in FIG. 2) in the lower section 2.

Figure 3:
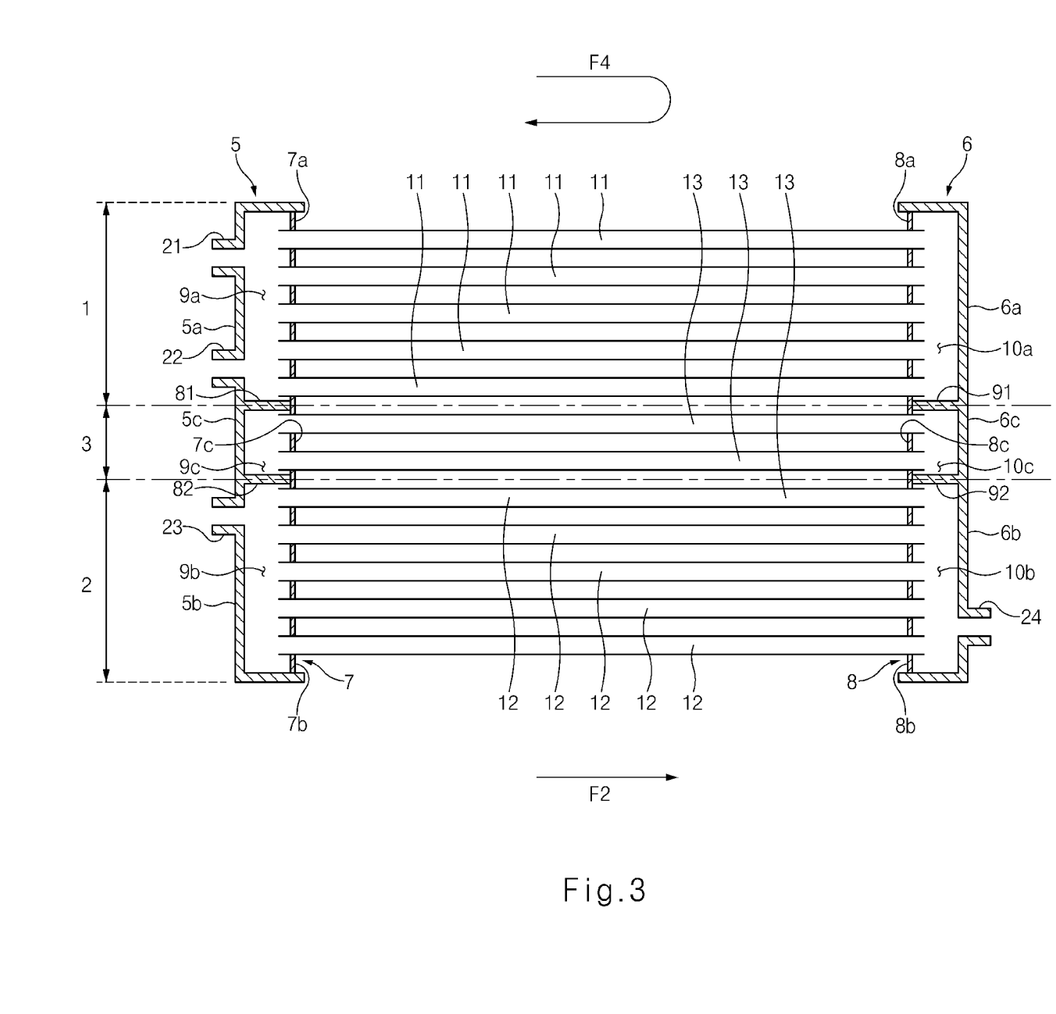
FIG. 3 illustrates an integrated radiator according to another exemplary embodiment of the present disclosure.

According to an exemplary embodiment illustrated in FIG. 3, the upper inlet 21 may be positioned in the upper portion of the first upper tank 5a, and the upper outlet 22 may be positioned in the lower portion of the first upper tank 5a. Accordingly, the upper-side coolant may flow from the upper portion of the first upper tank 5a to the lower portion of the first upper tank 5a through the plurality of upper tubes 11, and thus the upper-side coolant may flow in a U-shaped flow path (see direction F4 in FIG. 3) in the upper section 1.

According to the exemplary embodiment illustrated in FIG. 3, the lower inlet 23 may be positioned in the upper portion of the first lower tank 5b, and the lower outlet 24 may be positioned in the lower portion of the second lower tank 6b. Accordingly, the lower-side coolant may flow from the upper portion of the first lower tank 5b to the lower portion of the second lower tank 6b through the plurality of lower tubes 12, and thus the lower-side coolant may flow linearly (see direction F2 in FIG. 3) in the lower section 2.

Figure 4:
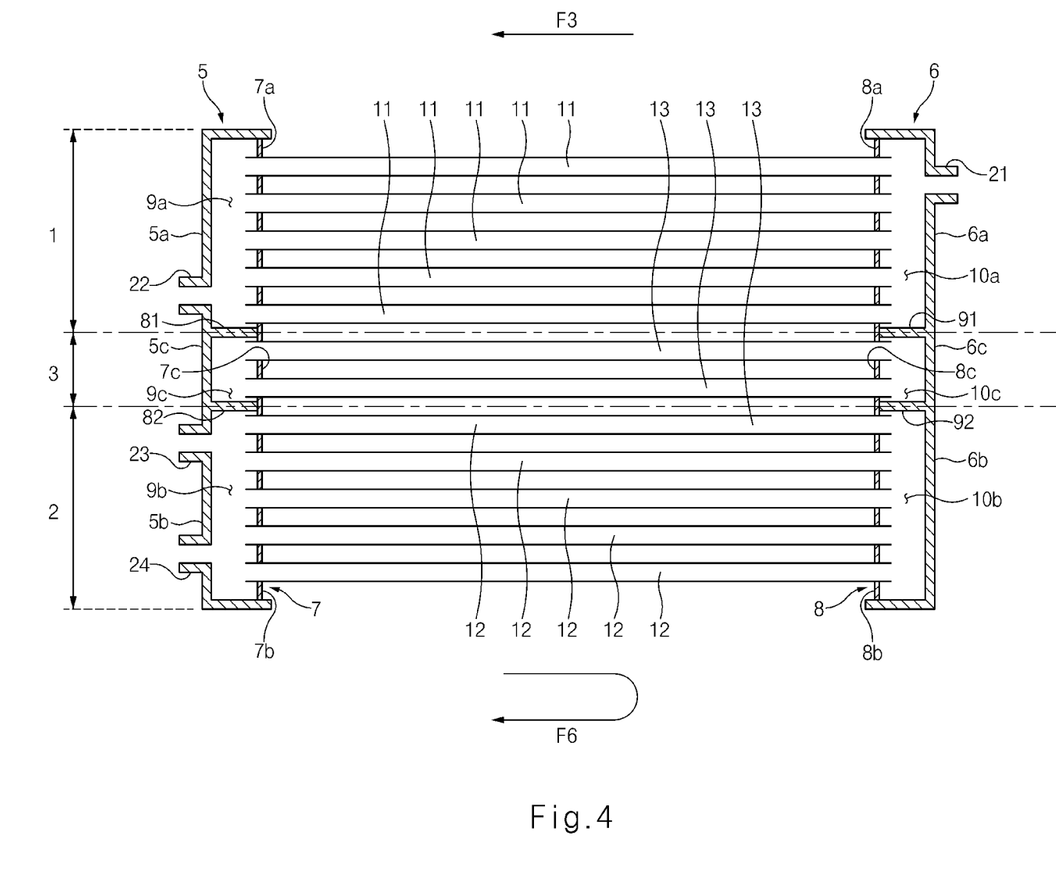
FIG. 4 illustrates an integrated radiator according to another exemplary embodiment of the present disclosure.

According to an exemplary embodiment illustrated in FIG. 4, the upper inlet 21 may be positioned in the upper portion of the second upper tank 6a, and the upper outlet 22 may be positioned in the lower portion of the first upper tank 5a. Accordingly, the upper-side coolant may flow from the upper portion of the second upper tank 6a to the lower portion of the first upper tank 5a through the plurality of upper tubes 11, and thus the upper-side coolant may flow linearly (see direction F3 in FIG. 4) in the upper section 1.

According to the exemplary embodiment illustrated in FIG. 4, the lower inlet 23 may be positioned in the upper portion of the first lower tank 5b, and the lower outlet 24 may be positioned in a lower portion of the first lower tank 5b. Accordingly, the lower-side coolant may flow from the upper portion of the first lower tank 5b to the lower portion of the first lower tank 5b through the plurality of lower tubes 12, and thus the lower-side coolant may flow in a U-shaped flow path (see direction F6 in FIG. 4) in the lower section 2.

Figure 5:
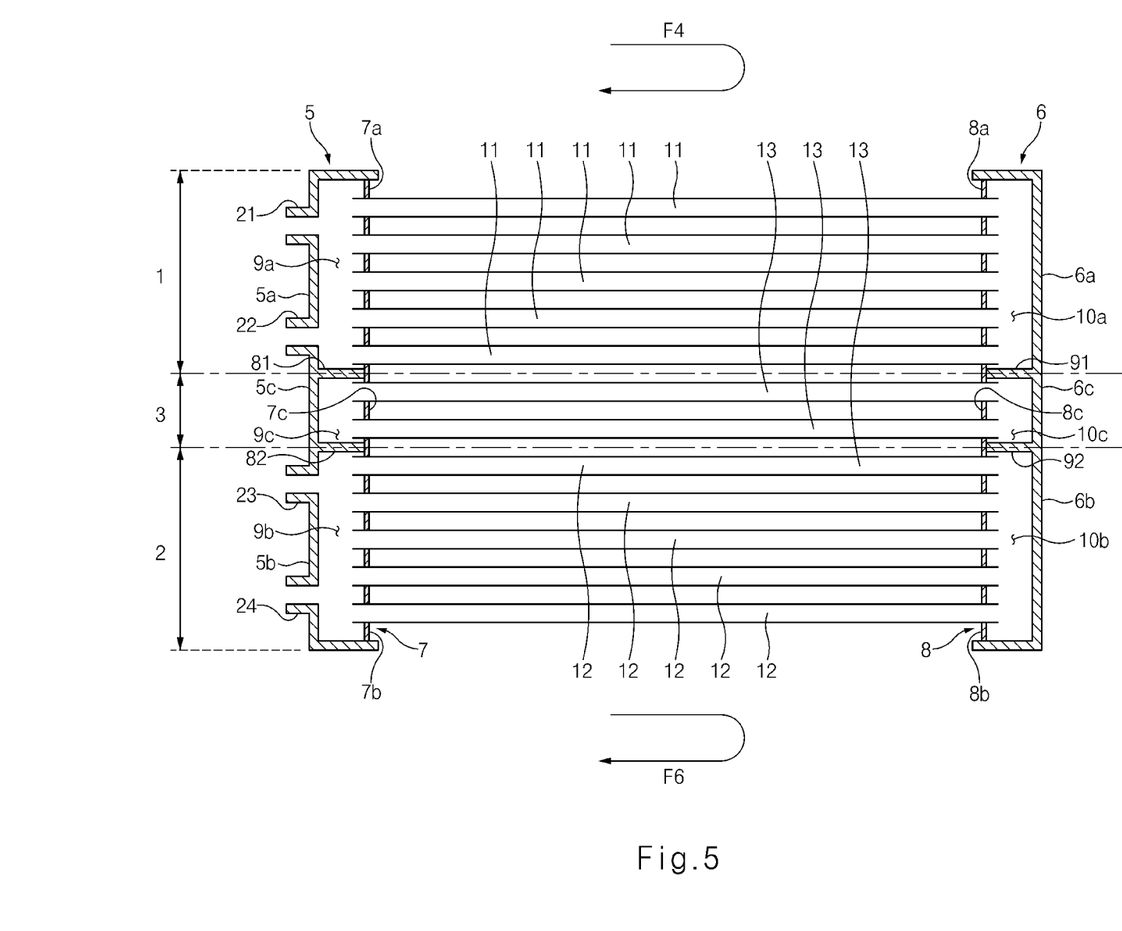
FIG. 5 illustrates an integrated radiator according to another exemplary embodiment of the present disclosure.

According to an exemplary embodiment illustrated in FIG. 5, the upper inlet 21 may be positioned in the upper portion of the first upper tank 5a, and the upper outlet 22 may be positioned in the lower portion of the first upper tank 5a. Accordingly, the upper-side coolant may flow from the upper portion of the first upper tank 5a to the lower portion of the first upper tank 5a through the plurality of upper tubes 11, and thus the upper-side coolant may flow in a U-shaped flow path (see direction F4 in FIG. 5) in the upper section 1.

According to the exemplary embodiment illustrated in FIG. 5, the lower inlet 23 may be positioned in the upper portion of the first lower tank 5b, and the lower outlet 24 may be positioned in the lower portion of the first lower tank 5b. Accordingly, the lower-side coolant may flow from the upper portion of the first lower tank 5b to the lower portion of the first lower tank 5b through the plurality of lower tubes 12, and thus the lower-side coolant may flow in a U-shaped flow path (see direction F6 in FIG. 5) in the lower section 2.

As described above, the upper inlet 21 and the upper outlet 22 may be selectively disposed in the first upper tank 5a and/or the second upper tank 6a of the upper section 1 to determine various flow directions of the upper-side coolant. The lower inlet 23 and the lower outlet 24 may be selectively disposed in the first lower tank 5b and/or the second lower tank 6b of the lower section 2 to determine various flow directions of the lower-side coolant. The positions of the upper inlet 21 and the upper outlet 22 and the positions of the lower inlet 23 and the lower outlet 24 are not limited to those in the exemplary embodiments of FIGS. 1 to 5, and may change variously.

The middle section 3 may not have an inlet and an outlet, and the middle section 3 may be fluidly separated from the upper section 1 and the lower section 2. The middle section 3 may be partitioned from the upper section 1 and the lower section 2 by a plurality of baffles 81, 82, 91, and 92.

Referring to FIGS. 1 to 6, the plurality of baffles 81, 82, 91, and 92 may include a first upper baffle 81 and a first lower baffle 82 extending from the first tank 5 to the first header 7 and a second upper baffle 91 and a second lower baffle 92 extending from the second tank 6 to the second header 8.

The first upper baffle 81 may horizontally extend from a bottom end of the first upper tank 5a toward a bottom end of the first upper header 7a, and the first upper baffle 81 may be sealingly connected to the bottom end of the first upper header 7a through a sealing member 81a. The sealing member 81a may be provided between a free end of the first upper baffle 81 and the bottom end of the first upper header 7a, thus the sealing member 81a may seal between a free end of the first upper baffle 81 and the bottom end of the first upper header 7a. The sealing member 81a may be secured to the free end of the first upper baffle 81. The first upper baffle 81 may fluidly separate the first upper chamber 9a and the first middle chamber 9c.

The first lower baffle 82 may horizontally extend from a top end of the first lower tank 5b toward a top end of the first lower header 7b, and the first lower baffle 82 may be sealingly connected to the top end of the first lower header 7b through a sealing member 82a. The sealing member 82a may be provided between a free end of the first lower baffle 82 and the first lower header 7b, thus the sealing member 82a may seal the free end of the first lower baffle 82 and the first lower header 7b. The sealing member 82a may be secured to the free end of the first lower header 7b. The first lower baffle 82 may fluidly separate the first lower chamber 9b and the first middle chamber 9c.

The second upper baffle 91 may horizontally extend from a bottom end of the second upper tank 6a toward a bottom end of the second upper header 8a, and the second upper baffle 91 may be sealingly connected to the bottom end of the second upper header 8a through a sealing member 91a. The sealing member 91a is provided between a free end of the second upper baffle 91 and the bottom end of the second upper header 8a, thus the sealing member 91a may seal the free end of the second upper baffle 91 and the bottom end of the second upper header 8a. The sealing member 91a may be secured to the free end of the second upper baffle 91. The second upper baffle 91 may fluidly separate the second upper chamber 10a and the second middle chamber 10c.

The second lower baffle 92 may horizontally extend from a top end of the second lower tank 6b toward a top end of the second lower header 8b, and the second lower baffle 92 may be sealingly connected to the top end of the second lower header 8b through a sealing member 92a. The sealing member 92a is provided between a free end of the second lower baffle 92 and the top end of the second lower header 8b, thus the sealing member 92a may seal the free end of the second lower baffle 92 and the top end of the second lower header 8b. The sealing member 92a may be secured to the free end of the second lower baffle 92. The second lower baffle 92 may fluidly separate the second lower chamber bob and the second middle chamber 10c.

Referring to FIGS. 1 to 6, the middle section 3 may include two or more middle tubes 13, and each middle tube 13 may receive a cooling medium such as air, a coolant, and a heat storage material in an internal passage thereof. Each end portion of the middle tube 13 may be blocked by a plurality of blocking units 30 and 60.

The plurality of blocking units 30 and 60 may include a first blocking unit 30 sealingly blocking the first end portion of each middle tube 13, and a second blocking unit 60 sealingly blocking the second end portion of each middle tube 13.

Figure 7:
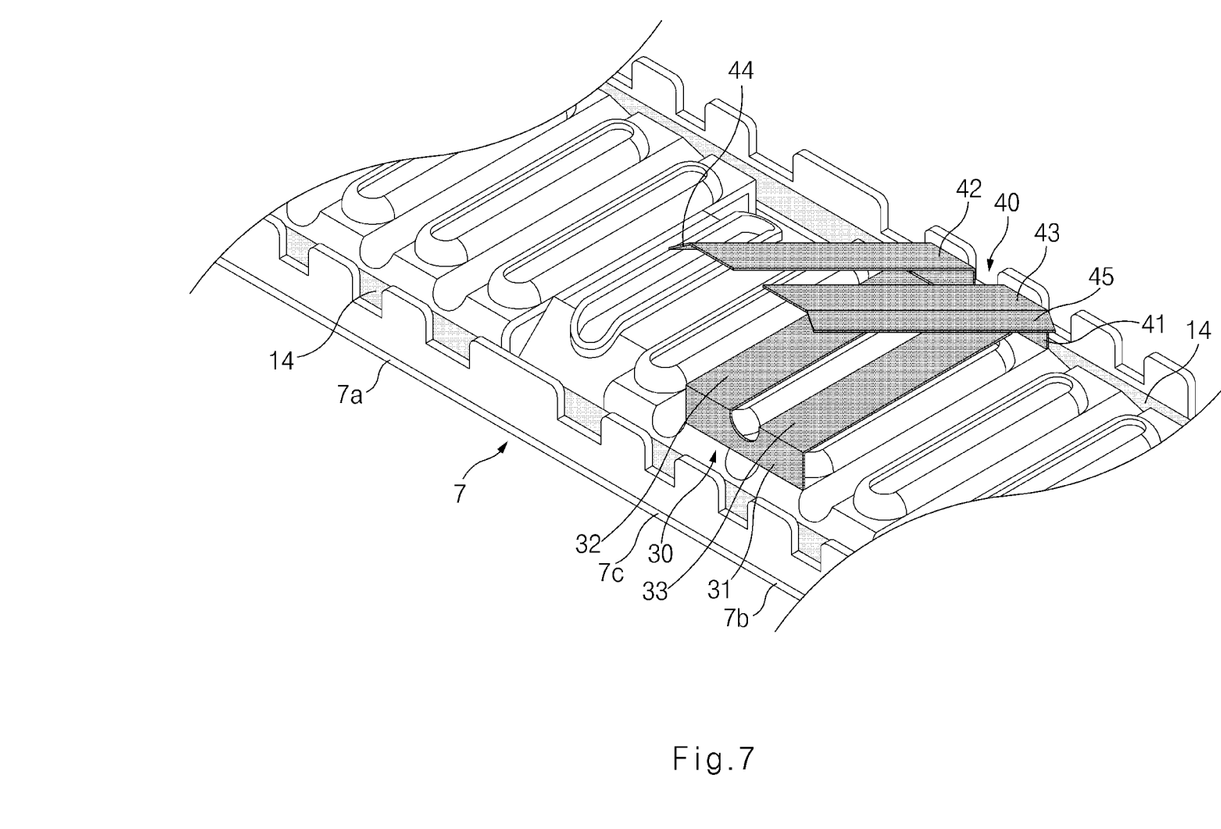
FIG. 7 illustrates a first blocking unit and a first support unit provided to a first middle header of an integrated radiator according to an exemplary embodiment of the present disclosure.
Figure 8:
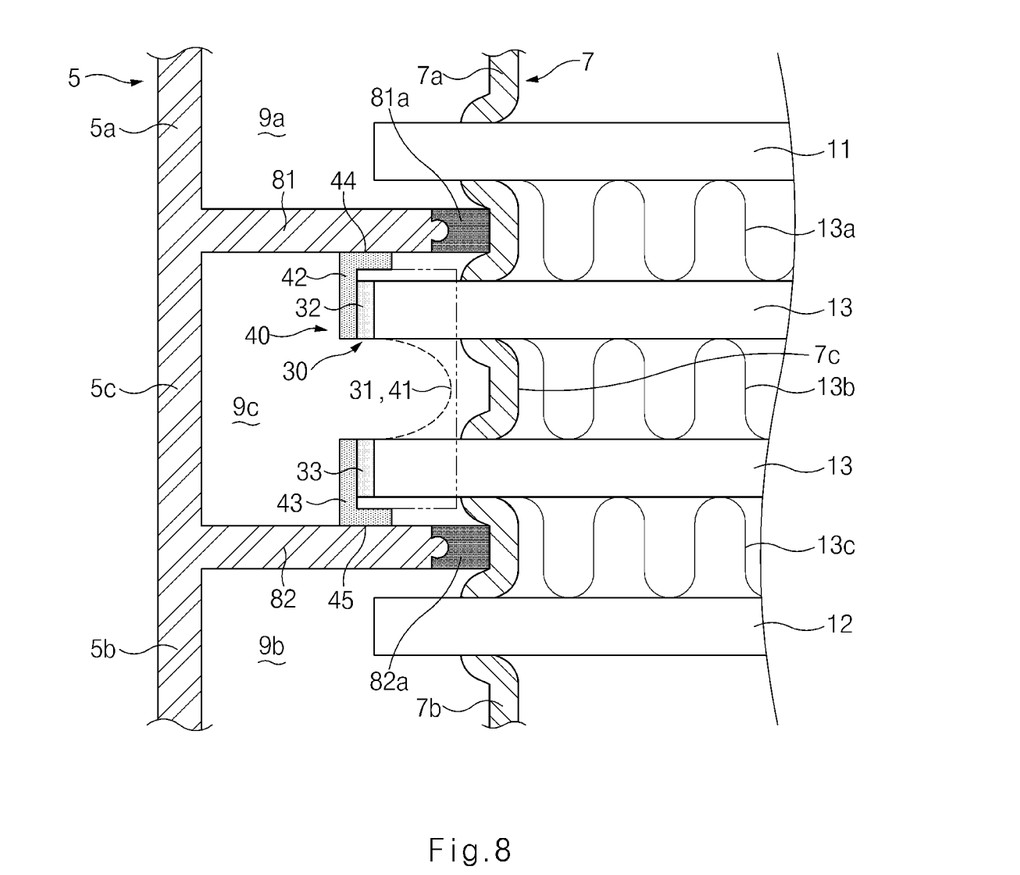
FIG. 8 illustrates a state in which a first end portion of a middle tube is blocked by a first blocking unit and a first support unit in an integrated radiator according to an exemplary embodiment of the present disclosure.

The first blocking unit 30 may be connected to one edge of the first middle header 7c. Referring to FIG. 7, the first blocking unit 30 may include a first blocking rib 31 extending from one edge of the first middle header 7c and two or more first blocking portions 32 and 33 foldably or unfoldably connected to the first blocking rib 31. The number of the first blocking portions 32 and 33 may correspond to the number of the middle tubes 13, and each of the first blocking portions 32 and 33 may be folded toward the first end portion of the corresponding middle tube 13 so that each of the first blocking portions 32 and 33 may be tightly attached to the first end portion of the corresponding middle tube 13 as illustrated in FIG. 8. Each of the first blocking portions 32 and 33 may have a larger area than that of an opening provided in the first end portion of the corresponding middle tube 13, and each of the first blocking portions 32 and 33 may cover the first end portion of the corresponding middle tube 13 so that the first end portion of the corresponding middle tube 13 may be completely blocked (closed).

According to an exemplary embodiment of the present disclosure, the integrated radiator may further include a first support unit 40 sealingly supporting the first blocking portions 32 and 33 of the first blocking unit 30. The first support unit 40 may be connected to the other edge of the first middle header 7c. Referring to FIG. 7, the first support unit 40 may include a first support rib 41 extending from the other edge of the first middle header 7c, two or more first support portions 42 and 43 foldably or unfoldably connected to the first support rib 41, and two or more first edge support portions 44 and 45 foldably or unfoldably connected to edges of the corresponding first support portions 42 and 43. The first support rib 41 may oppose the first blocking rib 31.

The number of the first support portions 42 and 43 may correspond to the number of the first blocking portions 32 and 33, and the first support portions 42 and 43 may be folded toward the corresponding first blocking portions 32 and 33 so that the first support portions 42 and 43 may be tightly attached to the corresponding first blocking portions 32 and 33 as illustrated in FIG. 8. The first edge support portions 44 and 45 may be foldably or unfoldably connected to the edges of the corresponding first support portions 42 and 43, respectively. The first edge support portions 44 and 45 may be folded from the corresponding first support portions 42 and 43 toward the corresponding middle tubes 13 so that each of the first edge support portions 44 and 45 may be tightly attached to a top edge or a bottom edge of the corresponding middle tube 13.

Referring to FIG. 8, the upper first blocking portion 32 may block the first end portion of the upper middle tube 13, the upper first support portion 42 may be tightly attached to the upper first blocking portion 32, and the upper first edge support portion 44 may be tightly attached to the top edge of the first end portion of the upper middle tube 13 so that the first end portion of the upper middle tube 13 may be tightly sealed. The lower first blocking portion 33 may block the first end portion of the lower middle tube 13, the lower first support portion 43 may be tightly attached to the lower first blocking portion 33, and the lower first edge support portion 45 may be tightly attached to the bottom edge of the first end portion of the lower middle tube 13 so that the first end portion of the lower middle tube 13 may be tightly sealed.

Figure 9:
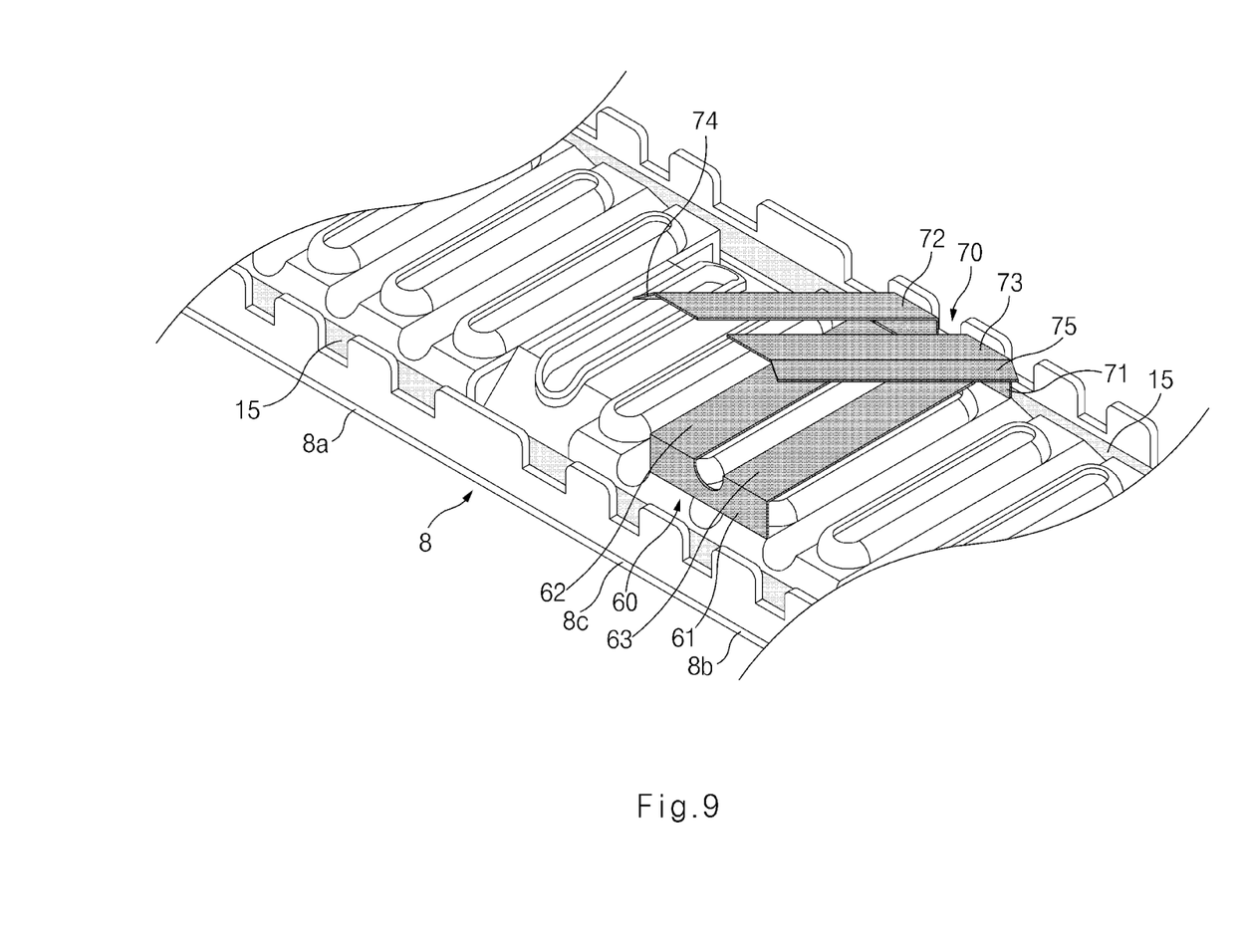
FIG. 9 illustrates a second blocking unit and a second support unit provided to a second middle header of an integrated radiator according to an exemplary embodiment of the present disclosure.
Figure 10:
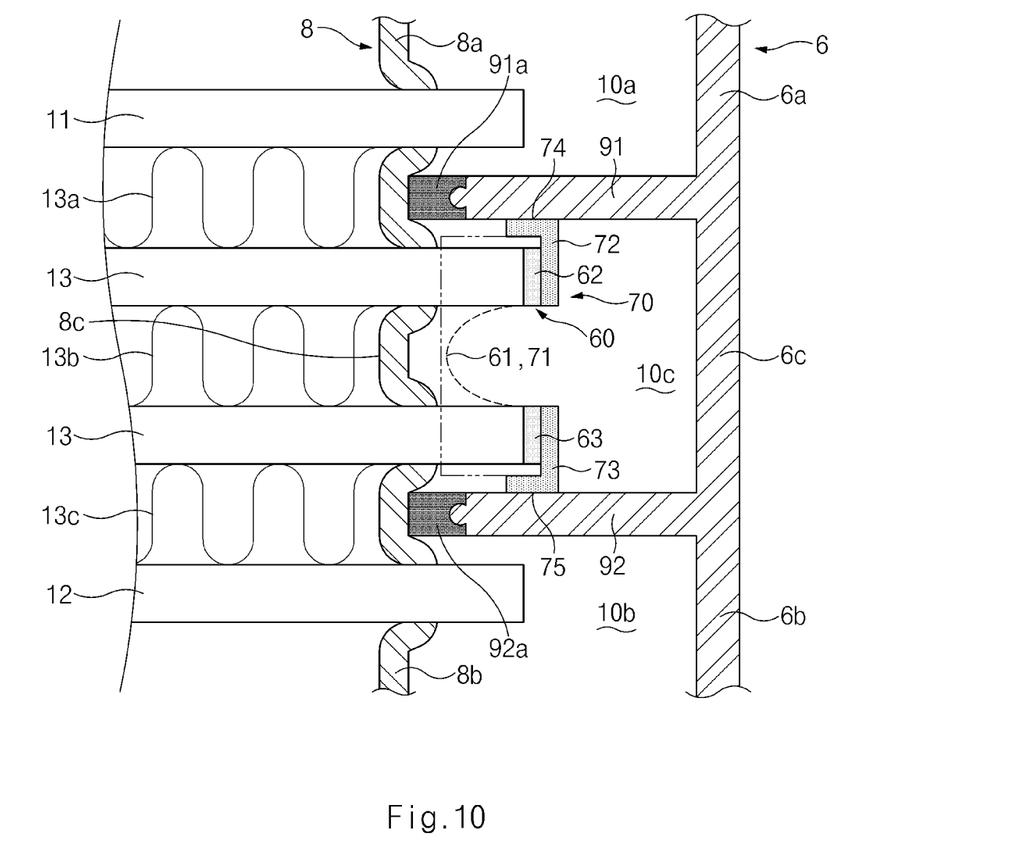
FIG. 10 illustrates a state in which a second end portion of a middle tube is blocked by a second blocking unit and a second support unit in an integrated radiator according to an exemplary embodiment of the present disclosure.

The second blocking unit 60 may be connected to one edge of the second middle header 8c. Referring to FIG. 9, the second blocking unit 60 may include a second blocking rib 61 extending from one edge of the second middle header 8c, and two or more second blocking portions 62 and 63 foldably or unfoldably connected to the second blocking rib 61. The number of the second blocking portions 62 and 63 may correspond to the number of the middle tubes 13, and each of the second blocking portions 62 and 63 may be folded toward the second end portion of the corresponding middle tube 13 so that each of the second blocking portions 62 and 63 may be tightly attached to the second end portion of the corresponding middle tube 13 as illustrated in FIG. 10. Each of the second blocking portions 62 and 63 may have a larger area than that of an opening provided in the second end portion of the corresponding middle tube 13, and each of the second blocking portions 62 and 63 may cover the second end portion of the corresponding middle tube 13 so that the second end portion of the corresponding middle tube 13 may be completely blocked (closed).

According to an exemplary embodiment of the present disclosure, the integrated radiator may further include a second support unit 70 sealingly supporting the second blocking portions 62 and 63 of the second blocking unit 60. The second support unit 70 may be connected to the other edge of the second middle header 8c. Referring to FIG. 9, the second support unit 70 may include a second support rib 71 extending from the other edge of the second middle header 8c, two or more second support portions 72 and 73 foldably or unfoldably connected to the second support rib 71, and two or more second edge support portions 74 and 75 foldably or unfoldably connected to edges of the corresponding second support portions 72 and 73.

The second support rib 71 may oppose the second blocking rib 61. The number of the second support portions 72 and 73 may correspond to the number of the second blocking portions 62 and 63, and the second support portions 72 and 73 may be folded toward the corresponding second blocking portions 62 and 63 so that the second support portions 72 and 73 may be tightly attached to the corresponding second blocking portions 62 and 63 as illustrated in FIG. 10. The second edge support portions 74 and 75 may be foldably or unfoldably connected to the edges of the corresponding second support portions 72 and 73, respectively. The second edge support portions 74 and 75 may be folded from the corresponding second support portions 72 and 73 toward the corresponding middle tubes 13 so that each of the second edge support portions 74 and 75 may be tightly attached to a top edge or a bottom edge of the corresponding middle tube 13.

Referring to FIG. 10, the upper second blocking portion 62 may block the second end portion of the upper middle tube 13, the upper second support portion 72 may be tightly attached to the upper second blocking portion 62, and the upper second edge support portion 74 may be tightly attached to the top edge of the second end portion of the upper middle tube 13 so that the second end portion of the upper middle tube 13 may be tightly sealed. The lower second blocking portion 63 may block the second end portion of the lower middle tube 13, the lower second support portion 73 may be tightly attached to the lower second blocking portion 63, and the lower second edge support portion 75 may be tightly attached to the bottom edge of the second end portion of the lower middle tube 13 so that the second end portion of the lower middle tube 13 may be tightly sealed.

As set forth above, according to exemplary embodiments of the present disclosure, the middle section including a cooling medium may be interposed between the upper section through which the upper-side coolant passes and the lower section through which the lower-side coolant passes, thereby improving the cooling performance of at least one of the upper section and the lower section or improving the cooling performance of the upper section and the cooling performance of the lower section simultaneously. For example, when a temperature difference between the upper-side coolant and the lower-side coolant is relatively low, the middle section may assist in the cooling of the upper section and the cooling of the lower section, thereby improving the cooling performance of the upper section and the cooling performance of the lower section simultaneously. When a temperature difference between the upper-side coolant and the lower-side coolant is relatively high, the middle section may be used to transfer heat from a relatively high temperature section to a relatively low temperature section, thereby improving the cooling performance of at least one of the upper section and the lower section.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An integrated radiator comprising:
    an upper section comprising an upper tube, a first upper tank fluidly connected to a first end portion of the upper tube, a first upper header sealingly joined to the first upper tank, a second upper tank fluidly connected to a second end portion of the upper tube, and a second upper header sealingly joined to the second upper tank, wherein the upper tube is configured to pass an upper-side coolant therethrough;
    a lower section comprising a lower tube, a first lower tank fluidly connected to a first end portion of the lower tube, a first lower header sealingly joined to the first lower tank, a second lower tank fluidly connected to a second end portion of the lower tube, and a second lower header sealingly joined to the second lower tank, wherein the lower tube is configured to pass a lower-side coolant therethrough;
    a middle section disposed between the upper section and the lower section, the middle section comprising a middle tube, a first middle tank fluidly connected to a first end portion of the middle tube, a first middle header sealingly joined to the first middle tank, a second middle tank fluidly connected to a second end portion of the middle tube, and a second middle header sealingly joined to the second middle tank, wherein the middle tube is configured to receive a cooling medium therein; and
    a first blocking unit sealingly blocking the first end portion of the middle tube,
    wherein the first blocking unit comprises:
        a first blocking rib extending from the first middle header; and
        a first blocking portion foldably or unfoldably connected to the first blocking rib, and wherein the first blocking portion covers the first end portion of the middle tube.

2. The integrated radiator according to claim 1, further comprising a plurality of baffles fluidly separating the middle section from the upper section and the lower section.

3. The integrated radiator according to claim 2, wherein the plurality of baffles comprises:
    a first upper baffle horizontally extending from a bottom end of the first upper tank toward a bottom end of the first upper header;
    a first lower baffle horizontally extending from a top end of the first lower tank toward a top end of the first lower header;
    a second upper baffle horizontally extending from a bottom end of the second upper tank toward a bottom end of the second upper header; and
    a second lower baffle horizontally extending from a top end of the second lower tank toward a top end of the second lower header.

4. The integrated radiator according to claim 1, further comprising:
    a second blocking unit sealingly blocking the second end portion of the middle tube.

5. The integrated radiator according to claim 1, further comprising a first support unit sealingly supporting the first blocking unit.

6. The integrated radiator according to claim 5, wherein the first support unit comprises:
    a first support rib extending from the first middle header; and a first support portion foldably or unfoldably connected to the first support rib, wherein the first support portion is tightly attached to the first blocking portion.

7. The integrated radiator according to claim 6, wherein the first support unit further comprises a first edge support portion foldably or unfoldably connected to the first support portion.

8. The integrated radiator according to claim 4, wherein the second blocking unit comprises:
   a second blocking rib extending from the second middle header; and
   a second blocking portion foldably or unfoldably connected to the second blocking rib, wherein the second blocking portion blocks the second end portion of the middle tube.

9. The integrated radiator according to claim 8, further comprising a second support unit sealingly supporting the second blocking unit.

10. The integrated radiator according to claim 9, wherein the second support unit comprises:
    a second support rib extending from the second middle header; and
    a second support portion foldably or unfoldably connected to the second support rib, wherein the second support portion is tightly attached to the second blocking portion.

11. The integrated radiator according to claim 10, wherein the second support unit further comprises a second edge support portion foldably or unfoldably connected to the second support portion.

12. A method of forming an integrated radiator, the method comprising:
    providing an upper section comprising an upper tube, a first upper tank fluidly connected to a first end portion of the upper tube, a first upper header sealingly joined to the first upper tank, a second upper tank fluidly connected to a second end portion of the upper tube, and a second upper header sealingly joined to the second upper tank, wherein the upper tube passes an upper-side coolant therethrough; and
    providing a lower section comprising a lower tube, a first lower tank fluidly connected to a first end portion of the lower tube, a first lower header sealingly joined to the first lower tank, a second lower tank fluidly connected to a second end portion of the lower tube, and a second lower header sealingly joined to the second lower tank, wherein the lower tube passes a lower-side coolant therethrough; and
    providing a middle section between the upper section and the lower section, the middle section comprising a middle tube, a first middle tank fluidly connected to a first end portion of the middle tube, a first middle header sealingly joined to the first middle tank, a second middle tank fluidly connected to a second end portion of the middle tube, and a second middle header sealingly joined to the second middle tank, wherein the middle tube receives a cooling medium therein; and
    providing a first blocking unit sealingly blocking the first end portion of the middle tube,
    wherein the first blocking unit comprises:
       a first blocking rib extending from the first middle header; and
       a first blocking portion foldably or unfoldably connected to the first blocking rib, and
    wherein the first blocking portion covers the first end portion of the middle tube.

13. The method according to claim 12, further comprising providing a plurality of baffles fluidly separating the middle section from the upper section and the lower section, wherein the plurality of baffles comprises:
    a first upper baffle horizontally extending from a bottom end of the first upper tank toward a bottom end of the first upper header;
    a first lower baffle horizontally extending from a top end of the first lower tank toward a top end of the first lower header;
    a second upper baffle horizontally extending from a bottom end of the second upper tank toward a bottom end of the second upper header; and
    a second lower baffle horizontally extending from a top end of the second lower tank toward a top end of the second lower header.

14. The method according to claim 12, further comprising providing
    a second blocking unit sealingly blocking the second end portion of the middle tube.

15. The method according to claim 12, further comprising a first support unit sealingly supporting the first blocking unit, wherein the first support unit comprises:
    a first support rib extending from the first middle header;
    a first support portion foldably or unfoldably connected to the first support rib, wherein the first support portion is tightly attached to the first blocking portion; and
    a first edge support portion foldably or unfoldably connected to the first support portion.

16. The method according to claim 14, wherein the second blocking unit comprises:
    a second blocking rib extending from the second middle header; and
    a second blocking portion foldably or unfoldably connected to the second blocking rib, wherein the second blocking portion blocks the second end portion of the middle tube.

17. The method according to claim 16, further comprising a second support unit sealingly supporting the second blocking unit, wherein the second support unit comprises:
    a second support rib extending from the second middle header;
    a second support portion foldably or unfoldably connected to the second support rib, wherein the second support portion is tightly attached to the second blocking portion; and
    a second edge support portion foldably or unfoldably connected to the second support portion.

* * * * *